T. WILLIAMS.
CUTTING PLATE FOR MEAT CUTTERS.
APPLICATION FILED FEB. 20, 1909.
931,828.
Patented Aug. 24, 1909.
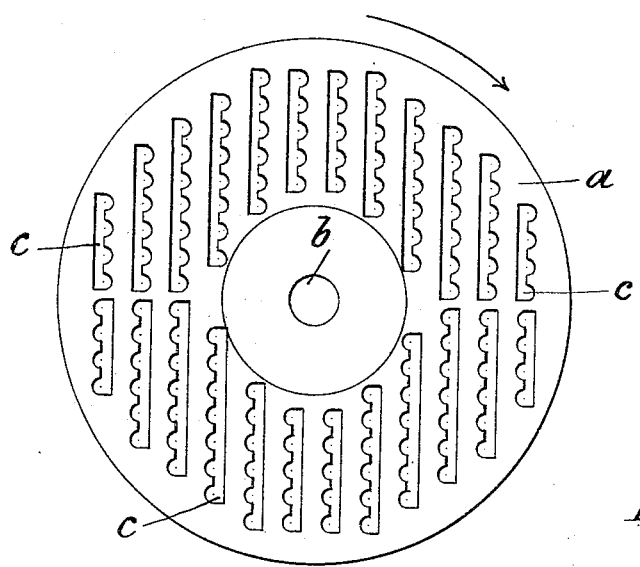
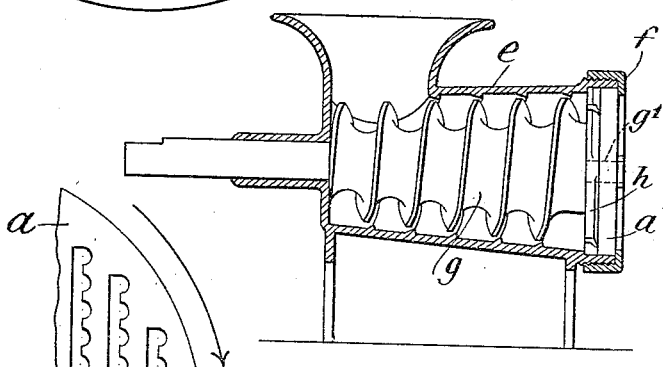
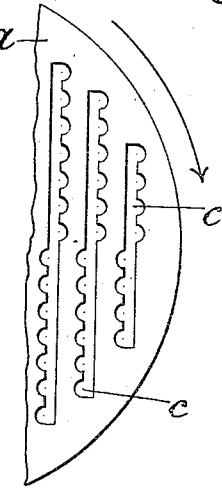
Witnesses:—
Inventor
Thomas Williams

UNITED STATES PATENT OFFICE.

THOMAS WILLIAMS, OF WEST SMITHFIELD, LONDON, ENGLAND.

CUTTING-PLATE FOR MEAT-CUTTERS.

931,828.　　　　Specification of Letters Patent.　　Patented Aug. 24, 1909.

Application filed February 20, 1909. Serial No. 479,289.

*To all whom it may concern:*

Be it known that I, THOMAS WILLIAMS, a subject of His Majesty the King of Great Britain, residing at 8 West Smithfield, London, E. C., England, engineer, have invented a certain new and useful Improved Cutting-Plate for Meat-Cutters; and I do hereby declare the following to be a full, clear, and exact description of the invention, such as will enable others skilled in the art to which it appertains to make and use the same.

In a well known type of meat cutter the delivery end of the casing is closed by a plate, known as a cutting plate, wherein are a number of apertures or perforations through which the meat or the like is forced, those portions of the meat which have entered the plate apertures being severed from the rest of the mass by means of a knife or knives revolving in cutting contact with the inner face of the plate and having a scissor like or shearing action in conjunction with the sharp edges of the plate apertures.

To secure the best results, combined with easy working, it is necessary that the construction of the cutting plate should be such as to reduce as much as possible the resistance to the exit of the meat or the like, and also to cause as many cuts as possible to be given to the meat at each revolution of the knife.

The original cutting plates were merely provided with a number of circular perforations; as an improvement on this a cutting plate was produced having radially disposed slots, serrated or notched along one side, extending through it, the revolving knife swept the meat forced into the slots into these notches or serrations, the sharp edges of the latter co-acting with the revolving knife to give scissor like cuts to the meat. This construction permitted freer egress of the meat but did not increase the number, to any extent, of cuts per revolution.

According to the present invention I improve upon the type of cutting plate last mentioned, by arranging all the notched or serrated slots so as to be parallel with a diametrical line of the plate, and by so doing, for a plate of given size, I am able to obtain a considerable increase in the aggregate slot length, as compared with radially disposed slots, and at the same time increase of course the number of the slot notches or serrations, where the principal cutting action takes place. The meat has thus obviously freer exit, rendering the machine very easy to work and the meat is also more finely cut up.

An important feature of my improved arrangement is that the slots or slot portions on one side of a diametrical line at right angles to them, have their notches or serrations on the opposite side to the slots or slot portions on the other side of said diametrical line, the result being that at all parts of its revolution the knife will tend to sweep the meat into the slot notches.

In the annexed drawings Figure 1 is an elevation of a cutting plate in accordance with my invention, Fig. 2 shows a slight modification; Fig. 3 shows in sectional elevation the application of my invention to a meat cutter of the type above referred to.

*a* is the cutting plate, *b* the usual hole or bearing therein for the end of the ordinary forcing screw, and *c* indicates slots, notched or serrated along one side, and all arranged parallel with a diametrical line of the plate. It will also be noted that the slots on one side of a diametrical line at right angles to them have their notches or serrations on the opposite side to the slots on the other side of said line.

In the modification Fig. 2 are shown continuous parallel slots *c*, the slot portions on one side of a diametrical line at right angles to them having their notches on the opposite side to those slot portions on the other side of said line.

Referring to Fig. 3, the forward end of the casing *e* of the meat cutter is closed by my above described cutting plate *a*, which is held in place by the retaining ring *f* screwed onto the end of the casing. *g* is the forcing screw whose axis *g'* rotates in the bearing *b* (Fig. 1) of plate *a*. *h* is a "star" knife mounted on the axis *g'* to rotate therewith and revolving in cutting contact with the face of plate *a* which is ground or faced true.

The arrows indicate the direction in which the knife would revolve.

What I claim and desire to secure by Let- ters Patent of the United States is:—

A cutting plate for meat cutters having a series of notched or serrated slots extending therethrough and arranged parallel with a diametrical line of the plate, the slots on one side of a diametrical line at right angles to them having their notches or serrations on the opposite side to the slots on the other side of said line, substantially as and for the purpose described and illustrated.

In testimony whereof I have hereunto set my hand in the presence of two witnesses.

THOMAS WILLIAMS.

Witnesses:
ERNEST OSWALD WEBB,
HENRY JAMES SCARLETT.